(12) United States Patent
Fukuda

(10) Patent No.: US 7,585,237 B2
(45) Date of Patent: Sep. 8, 2009

(54) BICYCLE COMPONENT WITH AXLE FIXING STRUCTURE

(75) Inventor: Masahiko Fukuda, Amagasaki (JP)

(73) Assignee: Shimano Inc., Osaka (JP)

( * ) Notice: Subject to any disclaimer, the term of this patent is extended or adjusted under 35 U.S.C. 154(b) by 728 days.

(21) Appl. No.: 10/990,964

(22) Filed: Nov. 18, 2004

(65) Prior Publication Data

US 2006/0105869 A1   May 18, 2006

(51) Int. Cl.
*F16H 63/34* (2006.01)
*F16D 9/04* (2006.01)

(52) U.S. Cl. .................. 474/80; 474/82; 474/78; 403/2; 411/178; 411/383; 411/325; 411/243; 411/244

(58) Field of Classification Search .......... 474/80, 474/82, 78; 403/2; 411/178, 383, 325, 243, 411/244, 546

See application file for complete search history.

(56) References Cited

U.S. PATENT DOCUMENTS

| | | | | |
|---|---|---|---|---|
| 779,482 A | * | 1/1905 | Kovalek | 301/114 |
| 1,002,452 A | * | 9/1911 | Rickards | 411/195 |
| 1,212,126 A | * | 1/1917 | Canfield | 411/215 |
| 2,577,810 A | * | 12/1951 | Rosan | 411/109 |
| 4,690,663 A | | 9/1987 | Nagano | |
| 5,421,786 A | | 6/1995 | Ando | |
| 5,494,307 A | * | 2/1996 | Anderson | 280/236 |
| 5,498,211 A | | 3/1996 | Hsu | |
| 5,553,960 A | | 9/1996 | Turer et al. | |
| 5,836,844 A | | 11/1998 | Yoshida | |
| 6,350,212 B1 | | 2/2002 | Campagnolo | |
| 6,447,413 B1 | * | 9/2002 | Turer et al. | 474/80 |
| 7,189,172 B2 | | 3/2007 | Shahana et al. | |

FOREIGN PATENT DOCUMENTS

CN   1506264 A   6/2004
FR   77695       4/1961

* cited by examiner

*Primary Examiner*—Robert A Siconolfi
*Assistant Examiner*—Mahbubur Rashid
(74) *Attorney, Agent, or Firm*—Global IP Counselors, LLP

(57) ABSTRACT

A bicycle component is configured with an axle fixing structure. In the preferred embodiment, the bicycle component is an electric derailleur. The bicycle component has a base member rotatably supported on an axle. Preferably, the axle includes a shaft portion with a head portion disposed adjacent a first end of the shaft portion for limiting axial movement of the base member in a first axial direction of the shaft portion, and a threaded portion disposed adjacent a second end of the shaft portion with external threads. A first locking member is threaded onto the external threads and configured to limit axial movement of the base member in a second axial direction of the shaft portion. Preferably, a second locking member is threaded into the internal threads of the second end of the shaft portion to secure the first locking member on the fastening portion of the axle.

11 Claims, 5 Drawing Sheets

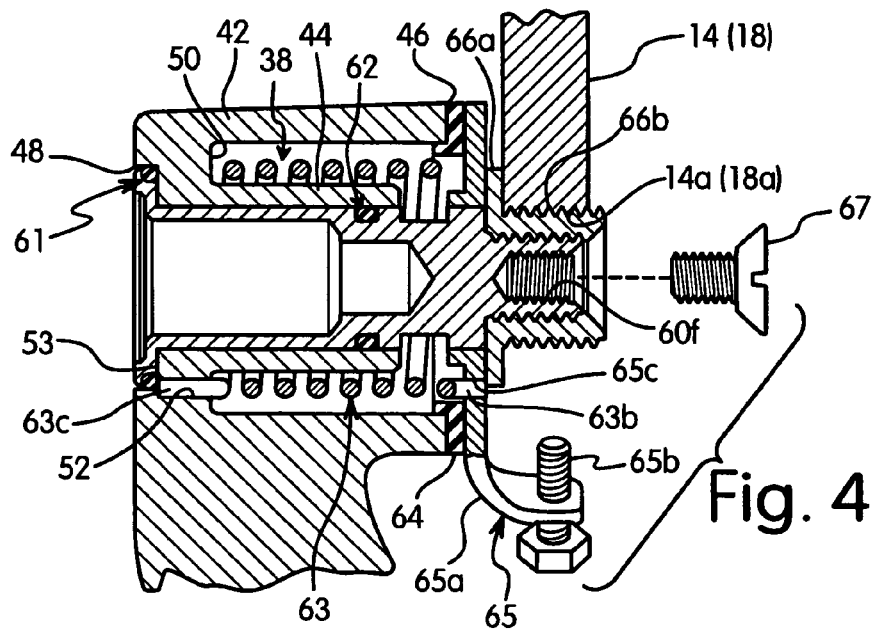
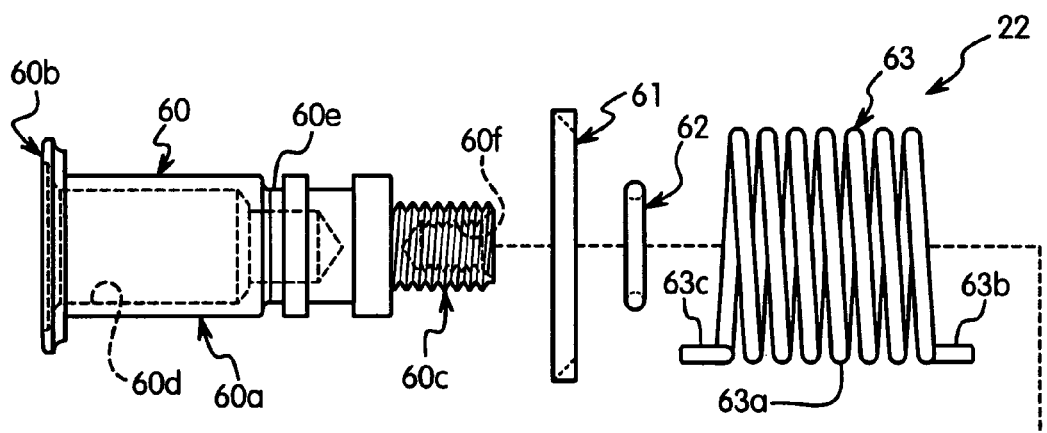
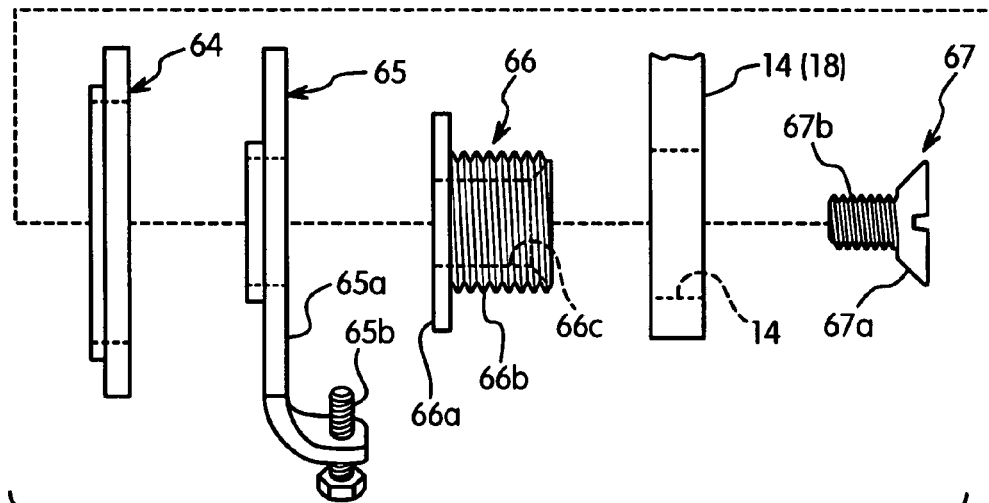
Fig. 5

BICYCLE COMPONENT WITH AXLE FIXING STRUCTURE

BACKGROUND OF THE INVENTION

1. Field of the Invention

This invention generally relates to a bicycle component with an axle fixing structure. More specifically, the present invention relates to a bicycle component such as a rear derailleur having a base member that is rotatably supported on an axle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the rear derailleur of the bicycle.

A typical rear derailleur has a base member that is fixed to the bicycle frame, a linkage mechanism and a moveable member with a chain guide that moves laterally relative to the bicycle frame by the linkage mechanism. Typically, a rear derailleur is operated by a cable that is coupled between the rear derailleur and a rider operating device or shifter. However, recently, electric derailleurs haven been introduced into the market. These electric derailleurs typically have an electric motor instead of a cable. Thus, movement of the chain guide is accomplished by a motor applying a force to move the linkage mechanism so that the chain guide moves the chain to the desired gear or sprocket.

Typically, both cable operated and electrically operated rear derailleurs have the base member fixed to the bicycle frame by a mounting axle that allows the rear derailleur to rotate about an axis generally perpendicular to the center plane of the axis so that the location of the chain guide can accommodate the different diameters rear gears or rear sprockets. During this movement of the rear derailleur about the mounting axle, the base member is urged in a direction transverse to the pivot axis by the engagement of the chain guide with the chain. When the base member is attached to the mounting axle by a split retaining ring or the like, the center axis of the base member can become misaligned with respect to the pivot axis of the mounting axle because the split retaining ring or the like does not provide 360 degrees of support to the base member. This misalignment of the base member on the mounting axle results in undesirable friction causing the force to operate the rear derailleur to increase. Accordingly, using a split retaining ring to attach the base member to the mounting axle does not efficiently transfer the energy from an applied force. When the rear derailleur is operated by a motor, this misalignment of the base member on the mounting axle results in the battery becoming discharged at a faster rate.

In view of the above, it will be apparent to those skilled in the art from this disclosure that there exists a need for an improved axle assembly that efficiently transfers energy. This invention addresses this need in the art as well as other needs, which will become apparent to those skilled in the art from this disclosure.

SUMMARY OF THE INVENTION

One object of the present invention is to provide a bicycle component that has a rigid axle assembly that improves the alignment of a rotatable member on an axle.

Another object of the present invention is to provide a bicycle component with an axle assembly that is a relatively simple and inexpensive to manufacture.

The foregoing objects can basically be attained by providing a bicycle component that comprises a base member, an axle that is rotatably coupled to the base member, and a first locking member. The axle has a head portion at a first end for limiting axial movement of the base member in a first axial direction. The axle has a threaded portion at a second end with internal threads and external threads. A first locking member is threaded onto the external threads and is configured to limit axial movement of the base member in a second axial direction. A second locking member is threaded into the internal threads.

The foregoing objects can also be attained by providing a bicycle component that comprises a base member, an axle that is rotatably coupled to the base member, a first locking member and a second locking member. The axle has a head portion at a first end for limiting axial movement of the base member in a first axial direction and a second end with a first and second fastening structure. The first locking member includes a first mating structure and an annular abutment configured to limit axial movement of the base member in a second axial direction when the first mating structure is engaged with the first fastening structure. The second locking member includes a second mating structure configured to engage the second fastening structure to secure the first locking member on the second end of the axle.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 4 is a longitudinal cross sectional view of the base member and the bracket axle assembly of the electric rear derailleur illustrated in FIG. 1;

FIG. 5 is an exploded side elevational view of the bracket axle assembly of the electric rear derailleur illustrated in FIG. 1;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
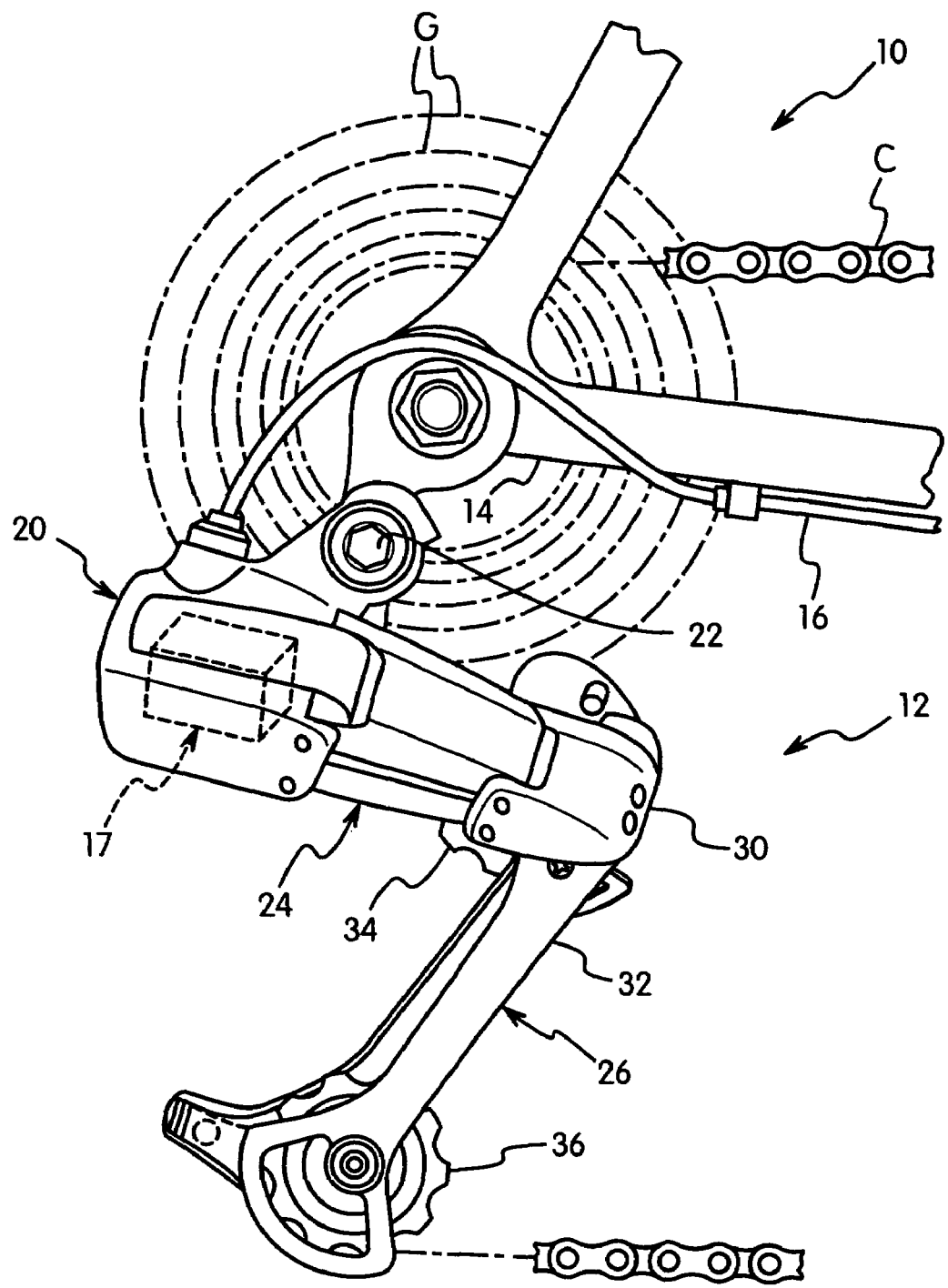
FIG. 1 is a partial outside elevational view of a rear fork end of a bicycle with an electric rear derailleur (bicycle component) in accordance with the present invention.

Referring initially to FIG. 1, a bicycle 10 (only a portion illustrated in FIG. 1) is illustrated with an electric rear derailleur 12 that is configured and arranged in accordance with a first embodiment of the present invention. Of course, while the present invention is especially useful in an electric rear derailleur, it will be apparent to those skilled in the art from this disclosure that the present invention can be used in other bicycle components that would use a similar structure.

In the illustrated embodiment, the electric rear derailleur 12 is fixedly coupled to a rear fork end of a frame 14 of the bicycle 10, which has a rear gear set with seven rear gears G. A chain C is operatively arranged between the rear gears G and a set of front gears or sprockets (not shown) in a conventional manner for transmitting the desired rotational torque to the rear wheel of the bicycle 10. The electric rear derailleur 12 is coupled to a rear derailleur shift operating mechanism (not shown) via an electric control cable 16 in a conventional manner. More specifically, when the rider operates the shift operating mechanism, the cable 16 operates an electric motor 17 of the electric rear derailleur 12 to move chain C inwardly or outwardly to engage the next gear.

Since most of the parts of the bicycle 10 are well known in the art, the parts of the bicycle 10 will not be discussed or illustrated in detail herein, except for the electric rear derailleur 12 that relates to the present invention. In other words, only the parts of the electric rear derailleur 12 will be discussed and illustrated in detail herein. Moreover, various conventional bicycle parts such as brakes, additional sprockets, derailleurs, etc., which are not illustrated and/or discussed in detail herein, can be used in conjunction with the present invention. In addition, as used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

As seen in FIG. 1, the electric rear derailleur 12, which is used to illustrate the present invention, is basically Shimano's NEXAVE Di2 rear derailleur. Accordingly, some of the parts of the electric rear derailleur 12 will only be briefly discussed herein. The electric rear derailleur 12 of the present invention basically includes a base member 20, a bracket axle assembly 22, a linkage assembly 24 and a chain guide assembly 26.

The base member 20 is movably fixed to the bicycle frame 14 by the bracket axle assembly 22. In particular, the base member 20 is mounted on the bracket axle assembly 22 in a rotatable manner, while the bracket axle assembly 22 is fixed to the bicycle frame 14 as discussed below in more detail. The linkage assembly 24 is movably coupled between the base member 20 and the chain guide assembly 26 such that the chain guide assembly 26 moves inwardly and outwardly relative to the center plane of the bicycle frame 14 in response to operation of the rear derailleur shift operating mechanism (not shown).

The precise structures of the linkage assembly 24 and the chain guide assembly 26 are not important to the present invention, and thus, will not be discussed or illustrated in detail herein. Basically, the linkage assembly 24 forms a four bar linkage with the base member 20 and a movable member 30 of the chain guide assembly 26. Basically, the chain guide assembly 26 further includes a chain guide 32 mounted to the movable member 30 in a rotatable manner, and a pair of pulleys 34 and 36 mounted to the chain guide 32 in a rotatable manner. Of course, it will be apparent to those skilled in the art from this disclosure that various modifications can be made to the linkage assembly 24 and chain guide assembly 26 without departing from the scope of the present invention.

As seen in FIG. 1, the base member 20 is attached at one end to the frame 14 of the bicycle 10 by the bracket axle assembly 22. The other end of the base member 20 is pivotally coupled to the linkage assembly 24 so that pivotal movement of the linkage assembly 24 relative to the base member 20 causes the chain guide assembly 26 to move inwardly and outwardly relative to the center plane of the bicycle frame 14. In particular, the electric motor 17 is mounted within the base member 20 with the output shaft of the electric motor 17 being operatively coupled to the linkage assembly 24 to pivot the linkage assembly 24 relative to the base member 20. While the base member 20 is illustrated as being coupled directly to the frame 14, it will be apparent to those skilled in the art from this disclosure that a removable derailleur hanger plate or bracket 18 can be utilized to connect the base member 20 of the rear derailleur 12 to the frame 14.

Figure 2:
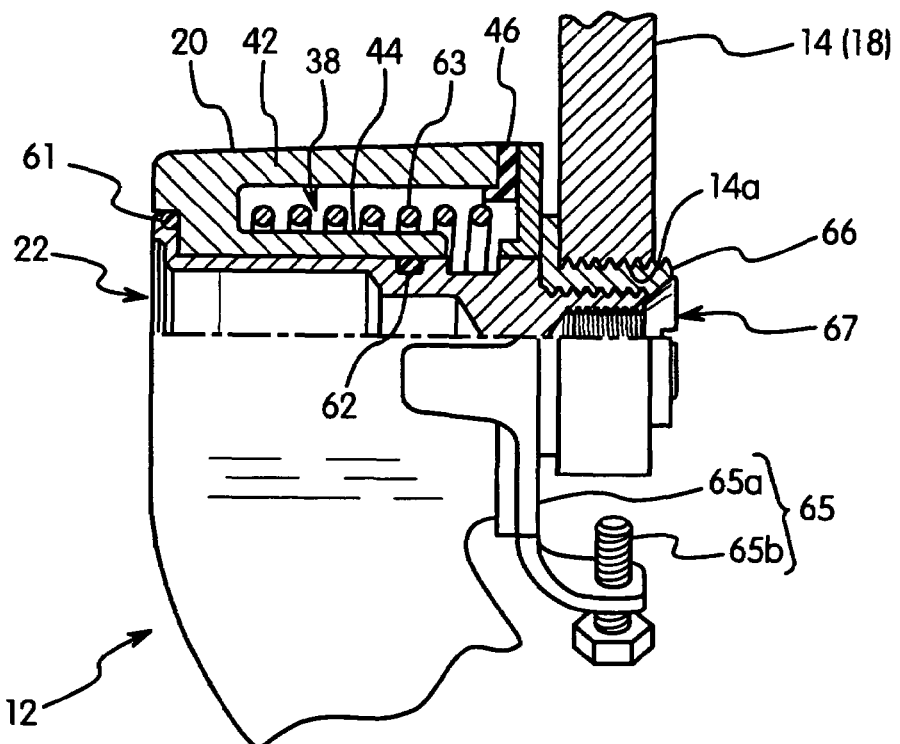
FIG. 2 is a partial cross-sectional view of a portion of the base member and the bracket axle assembly of the electric rear derailleur illustrated in FIG. 1, taken along a longitudinal axis of the bracket axle assembly.
Figure 3:
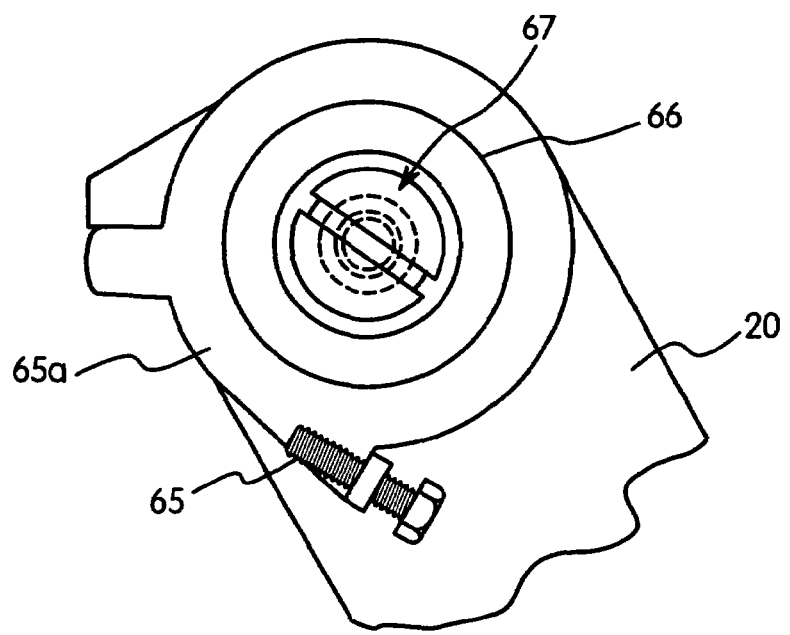
FIG. 3 is an enlarged, partial inside elevational view of the base member and the bracket axle assembly of the electric rear derailleur illustrated in FIG. 1 as viewed along the longitudinal pivot axis of the fixing bolt for the bracket axle assembly.
Figure 6:
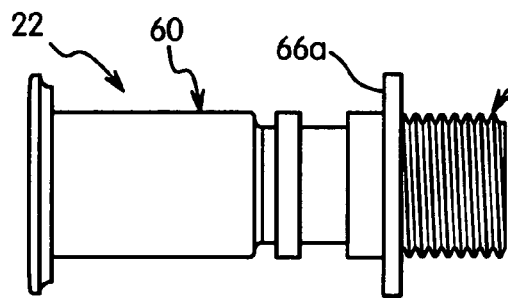
FIG. 6 is a side elevational view of a portion of the bracket axle assembly of the electric rear derailleur illustrated in FIG. 1.
Figure 7:
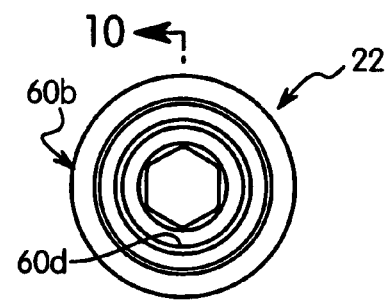
FIG. 7 is a front view of a portion of the bracket axle assembly of the electric rear derailleur illustrated in FIG. 1.
Figure 8:
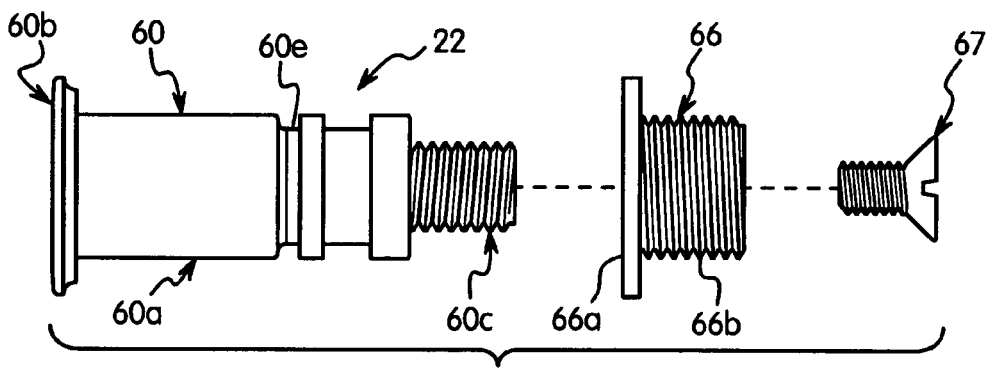
FIG. 8 is an exploded side elevational view of a portion of the bracket axle assembly of the electric rear derailleur illustrated in FIG. 1.
Figure 9:
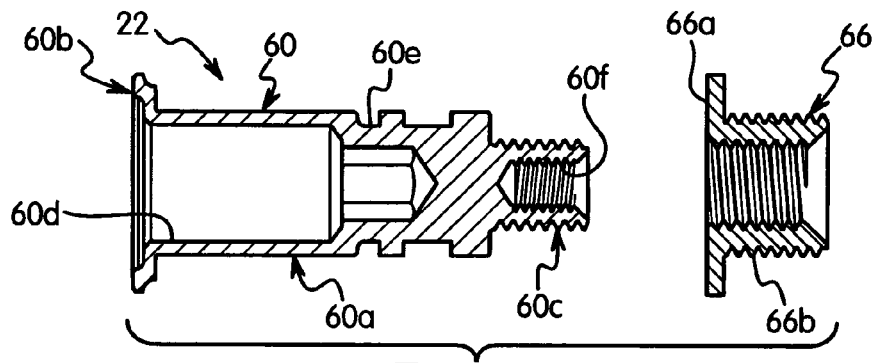
FIG. 9 is an exploded cross sectional view of a portion of the bracket axle assembly of the electric rear derailleur illustrated in FIG. 1.
Figure 10:
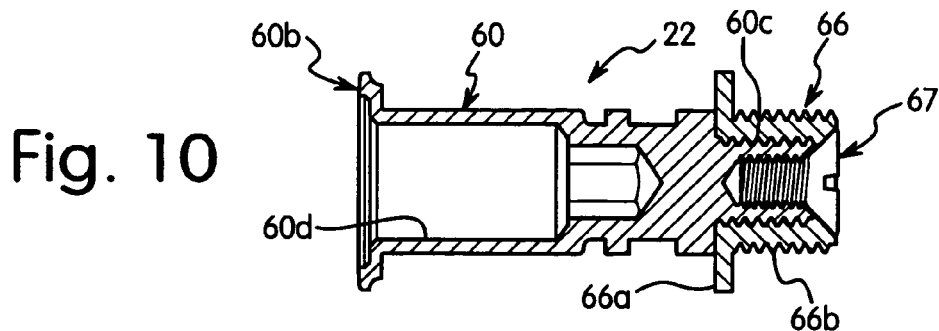
FIG. 10 is a cross sectional view of a portion of the assembled axle assembly of the electric rear derailleur illustrated in FIG. 1.

As seen in FIGS. 2, 3 and 5, the base member 20 is provided with a mounting bore 38 for receiving the bracket axle assembly 22 therein for attaching the rear derailleur 12 to the frame 14 of the bicycle 10. The mounting bore 38 of the base member 20 is defined by a first cylindrical or tubular wall section 42 with a first inner diameter and a second cylindrical or tubular wall section 44 with a second inner diameter. The first tubular wall section 42 extends to a first open end 46 of the mounting bore 38, while the second tubular wall section 44 extends to a second open end 48 of the mounting bore 38. The second inner diameter of the second tubular wall section 44 is smaller than the first inner diameter of the first tubular wall section 42 such that an end wall 50 extends radially between the first and second cylindrical sections 42 and 44.

The end wall 50 has a first axially facing surface that faces towards the first open end 46 of the mounting bore 38 with an axially extending blind bore 52 formed therein. The blind bore 52 is configured to receive part of the bracket axle assembly 22 as discussed below. A second axially facing surface of the radially extending end wall 50 has an annular recess 53 defining the second open end 48 of the mounting bore 38.

As best seen in FIGS. 4 and 5, the bracket axle assembly 22 basically includes an axle 60, a first O-ring or sealing member 61, a second O-ring or sealing member 62, a biasing member 63, a third O-ring or sealing member 64, a tension adjusting unit 65, a first locking member 66 and a second locking member 67.

The sealing members 61, 62 and 64 are conventional ring-type seals that are constructed from a conventional sealing material, such as an elastomeric material or other synthetic resins which are known in the bicycle art. The sealing members 61 and 62 are configured and arranged to seal various interfaces between the base member 20 and the axle 60, while the sealing member 64 seals an interface between the base member 20 and the tension adjusting unit 65. The sealing members 61, 62 and 64 prevent dirt and the like from entering the mounting bore 38 of the base member 20. Moreover, the shaft portion 60a can have additional seals as needed and/or desired.

As seen in FIGS. 5-10, the axle 60 has a shaft portion 60a, a head portion 60b and a fastening portion 60c. An axially extending blind bore 60d extends from the head portion 60b through most of the length of the shaft portion 60a to reduce the weight of the axle 60. The blind bore 60d is also preferably configured to form a tool engaging surface. Preferably, the axle 60 is constructed as a one-piece, unitary member from a relatively strong, lightweight material such as aluminum or titanium. Also as shown, it will be apparent to one of ordinary skill in the art from this disclosure that one or more recesses of various size and depth may be provided along the length of shaft portion 60a to reduce the weight of the bracket axle assembly 22 as well as the weight of the rear derailleur 12.

The shaft portion 60a is configured and arranged to support the base member 20 and the tension adjusting unit 65 thereon in a rotatable manner. Thus, the maximum diameter of the shaft portion 60a is dimensioned to be approximately the same size as the inner diameter of the second tubular wall section 44. The shaft portion 60a of the axle 60 preferably has an annular groove or recess 60e for receiving second O-ring or sealing member 62. The second tubular wall section 44 is rotatably supported on the peripheral surface of the shaft portion 60a. The interior surface of the first tubular wall section 42 is radially spaced outwardly from the peripheral surface of the shaft portion 60a to form an annular space for accommodating the biasing member 63. The annular space for accommodating the biasing member 63 is closed by the tension adjusting unit 65.

The head portion 60b is disposed adjacent to a first end of the shaft portion 60a whereas the fastening portion 60c is disposed adjacent a second end of the shaft portion 60a. The head portion 60b is preferably an annular flange that includes a tapered portion for seating the sealing member 61 thereon. When the base member 20 is mounted on the axle 60, the sealing member 61 is disposed in the recess 53 of the base member 20 to create a seal therebetween.

The fastening portion 60c of the axle 60 has external threads that form a first fastening structure of the bracket axle assembly 22 and an internally threaded bore 60f with the internal threads forming a second fastening structure. The external threads (first fastening structure) mate with the first locking member 66 to limit axial movement of the base member 20 in an axial direction of the shaft portion 60a. The external threads (first fastening structure) of the fastening portion 60c are preferably left hand external threads to releasably and directly engage the first locking member 66. The internal threads of the internally threaded bore 60f are preferably right hand threads to releasably and directly engage the second locking member 67 in order to secure the first locking member 66 on the fastening portion 60c of the axle 60. The external threads of the fastening portion 60c can be right or left hand threads as long as the internal threads of the internally threaded bore 60f are oppositely threaded.

The first locking member 66 is preferably constructed of rigid metallic material such as aluminum or titanium alloys. Preferably, the first locking member 66 is also constructed out of a lightweight material to minimize the weight of the rear derailleur 12. The first locking member 66 is preferably formed as a one-piece, annular, unitary member. The first locking member 66 basically includes an annular flange or abutment 66a and an externally threaded attachment portion 66b. An internally threaded bore 66c extends axially through the first locking member 66. The internally threaded bore 66c has internal threads that mate with the external threads of the fastening portion 60c. The internal threads of the internally threaded bore 66c form a first mating structure. The internal threads of the internally threaded bore 66c are preferably in the form of left hand threads and are configured and arranged to releasably and directly engage the external threads of the fastening portion 60c by an axial movement of the first locking member 66.

The abutment 66a can be a continuous annular abutment and is configured and arranged to limit axial movement of the base member 20 in a second axial direction of the shaft portion 60a when the first locking member 66 is threadedly engaged with the external threads of the fastening portion 60c of the axle 60. The abutment 66a also preferably contacts the tension adjusting unit 65 so that when the first locking member 66 is threadedly engaged with the external threads of the fastening portion 60c of the axle 60, the sealing member 64 will be held between the first tubular wall section 42 and the tension adjusting unit 65 to prevent dust and other contaminants from entering the open end 46 of the base member 20. FIG. 2 shows the sealing member 64 is preferably shaped as a ring that has an L-shape cross section. That is, the width of the sealing member 64 is wider at the inner diameter surface than the width at the outer diameter surface.

The attachment portion 66b of the first locking member 66 extends axially from the abutment 66a and is configured to secure the base member 20 to either a threaded hole 14a in the bicycle frame 14 or a threaded hole 18a in the bracket 18 coupled to the bicycle frame 14. The base member 20 is coupled to either the frame 14 or the bracket 18.

The second locking member 67 includes a head 67a and an externally threaded shaft 67b. The external threads of the threaded shaft 67b form a second mating structure that is configured and arranged to releasably engage the internal threads (second fastening structure) of the internally threaded bore of the fastening portion 60c of the axle 60. The head 67a is dimensioned to abut against the end surface of the first locking member 66 to prevent unintentional disengagement of the first locking member 66 from the fastening portion 60c of the axle 60. Thus, the second locking member 67 securely retains the first locking member 66 on the fastening portion 60c of the axle 60. The second locking member 67 is preferably a one-piece unitary member constructed out of a hard rigid material. More preferably, the second locking member 67 is in the form of a screw or bolt.

The tension adjusting unit 65 includes an adjusting plate 65a and an adjustment bolt 65b. The adjusting plate 65a is generally a ring-shaped member that is positioned at the first open end 46 of the mounting bore 38. The inner diameter of the adjusting plate 65a is arranged and configured to be placed over the shaft portion 60a, while the outer diameter of the adjusting plate 65a is flush with the outer diameter of the first tubular wall section 42. The adjusting plate 65a has a bore 65c formed on the side facing the mounting bore 38. The adjusting plate 65a is secured between the sealing member 64 and the first locking member 66. The conventional tension adjusting unit 65 is configured to adjust the tension of the biasing member 63 in a known manner. Since tension adjusting units are conventional parts which are well known in the prior art, the tension adjusting unit 65 will not be discussed or illustrated in further detail herein. Rather, it will be apparent to those skilled in the art that these features are utilized in the rear derailleurs sold by Shimano, Inc.

The biasing member 63 is preferably a coiled torsion spring or any other suitable torsional biasing device which can be used to carry out the present invention. The biasing member 63 is preferably formed from a metallic wire that has a coiled portion 63a with a first end portion 63b extending axially from one end of the coiled portion 63a and a second end portion 63c extending axially from the other end of the coiled portion 63a. The coiled portion 63a is located in the annular space formed between the interior surface of the first tubular wall section 42 and the peripheral surface of the shaft portion 60a. The first end portion 63b of the biasing member 63 is located in the bore 65c of the adjusting plate 65a. The second end portion 63c of the biasing member 63 is located in the blind bore 52 of the end wall 50 of the base member 20.

Second Embodiment

Figure 11:
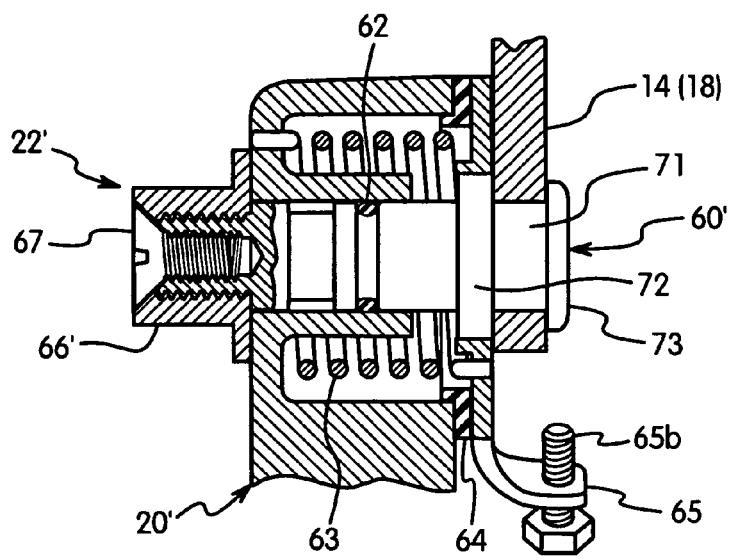
FIG. 11 is a partial cross sectional view of a portion of the base member and the bracket axle assembly of an electric rear derailleur in accordance with a second embodiment of the invention.
Figure 12:
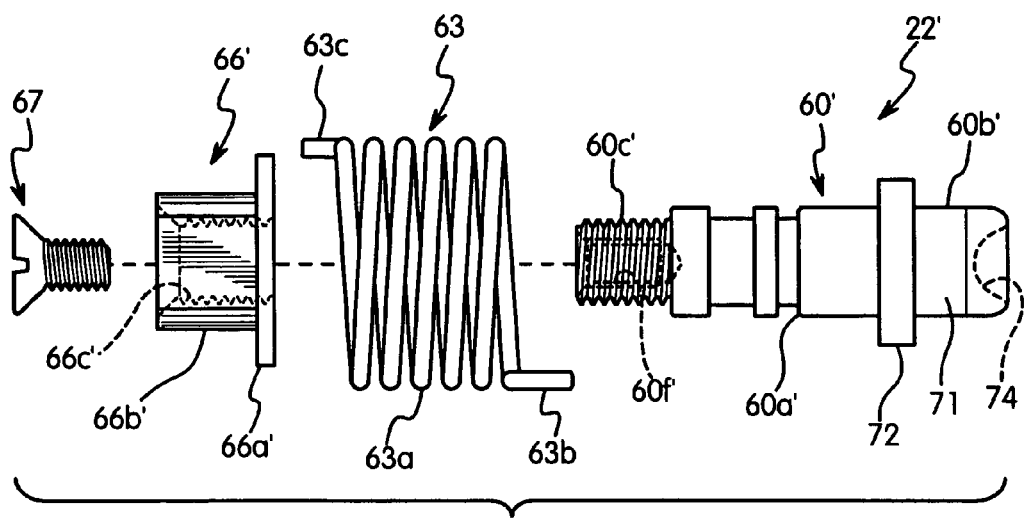
FIG. 12 is an exploded elevated side view of a portion of the bracket axle assembly illustrated in FIG. 11.

Referring now to FIGS. 11 and 12, a portion of a modified base member 20' and a modified bracket axle assembly 22' for the bicycle derailleur 12 will now be explained in accordance with a second embodiment. Basically, the base member 20' and the bracket axle assembly 22' replace the base member 20 and the bracket axle assembly 22 of the first embodiment such that the bicycle derailleur 12 is riveted to either the frame 14 or the bracket 18 instead of being bolted thereto. In other words, the base member 20' and the bracket axle assembly 22' are identical to the base member 20 and the bracket axle assembly 22 unless otherwise specified herein.

In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In this embodiment, the bracket axle assembly 22' basically includes a modified axle 60', the sealing member 62, the biasing member 63, the sealing member 64, the tension adjusting unit 65, a modified first locking member 66' and the second locking member 67. The modified axle 60' has a shaft portion 60a', a head portion 60b' and a fastening portion 60c'. The shaft portion 60a' is configured and arranged to support the base member 20' and the tension adjusting unit 65 thereon in a rotatable manner. Thus, the maximum diameter of the shaft portion 60a is dimensioned to be approximately the same size as the inner diameter of the second tubular wall section 44'. The head portion 60b' is disposed adjacent to a first end of the shaft portion 60a whereas the fastening portion 60c' is disposed adjacent a second end of the shaft portion 60a. The head portion 60b' forms an attachment portion 71 with an annular flange 72 and a radial abutment 73 (in the deformed state). The annular flange 72 and the radial abutment 73 are located adjacent to a free end surface of the first end of the modified axle 60'.

As illustrated in FIG. 12, the attachment portion 71 of head portion 60b' is shown in its undeformed state with an unthreaded shaft that is configured and arranged to be deformed as a rivet. A recess 74 can be provided in the free end surface of the attachment portion 71 to aid in the deformation of the free end of the attachment portion 71 in to the radial abutment 73. Thus, the attachment portion 71 is utilized as a rivet to secure the base member to either the bicycle frame 14 or the bracket 18 coupled to the bicycle frame 14. Basically, the bicycle frame 14 or bracket 18 is secured between the annular flange 72 and the continuous radial abutment 73.

The fastening portion 60c' of the axle 60' has external threads that form a first fastening structure of the bracket axle assembly 22' and an internally threaded bore 60f' with the internal threads forming a second fastening structure. The external threads (first fastening structure) mate with the first locking member 66' to limit axial movement of the base member 20' in an axial direction of the shaft portion 60a'. The external threads (first fastening structure) of the fastening portion 60c' are preferably left hand external threads to releasably and directly engage the first locking member 66'. The internal threads of the internally threaded bore 60f' are preferably right hand threads to releasably and directly engage the second locking member 67 in order to secure the first locking member 66' on the fastening portion 60c' of the axle 60'.

The first locking member 66' in the second embodiment of the present invention is substantially similar to the first locking member 66 of the previous embodiment. However, the first locking member 66' differs in that it does not include external threads. Rather, the first locking member 66' is preferably in the form of a nut that basically includes an annular flange or abutment 66a' and an attachment portion 66b'. An internally threaded bore 66c' extends axially through the first locking member 66'. The internally threaded bore 66c' has internal threads that mate with the external threads of the fastening portion 60c'. The internal threads of the internally threaded bore 66c' form a first mating structure. The internal threads of the internally threaded bore 66c' are preferably in the form of left hand threads and are configured and arranged to releasably and directly engage the external threads of the fastening portion 60c'.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle derailleur comprising:
 a base member;
 an axle including a shaft portion rotatably supporting the base member, a head portion disposed adjacent a first end of the shaft portion for limiting axial movement of the base member in a first axial direction of the shaft portion, and a fastening portion disposed adjacent a second end of the shaft portion with a first fastening structure having external threads and a second fastening structure having internal threads;

a first locking member including a first mating structure having internal threads that releasably and directly engage the external threads of the first fastening structure, an abutment limiting axial movement of the base member in a second axial direction of the shaft portion when the first mating structure is engaged with the first fastening structure, and an attachment portion having external threads that is configured to secure the base member to either a bicycle frame or a bracket coupled to the bicycle frame, the internal threads of the first mating structure and the external threads of the attachment portion being concentrically arranged and overlapping each other in an axial direction of the first locking member;

a second locking member including a second mating structure having external threads that releasably engage the internal threads of the second fastening structure to secure the first locking member on the fastening portion of the axle; and a chain guide movably coupled to the base member.

2. The bicycle derailleur according to claim, 1 wherein the external threads of the first fastening structure are left hand threads the internal threads of and the second fastening structure are right hand threads.

3. The bicycle derailleur according to claim 1, wherein the external threads of the first fastening structure are oppositely threaded relative to the internal threads of the second fastening structure.

4. The bicycle derailleur according to claim 1, wherein the abutment is a continuous annular abutment.

5. The bicycle derailleur according to claim 1, further comprising
a motor element configured and arranged to move the chain guide.

6. A bicycle derailleur comprising:
a base member;
an axle including a shaft portion rotatably supporting the base member, a head portion disposed adjacent a first end of the shaft portion for limiting axial movement of the base member in a first axial direction of the shaft portion, and a threaded portion disposed adjacent a second end of the shaft portion with external threads and internal threads;
a first locking member having internal threads threaded onto the external threads of the threaded portion of the axle and limiting axial movement of the base member in a second axial direction of the shaft portion, the first locking member further having external threads that are configured to secure the base member to either a bicycle frame or a bracket coupled to the bicycle frame, the internal and external threads of the first locking member being concentrically arranged and overlapping each other in an axial direction of the first locking member;
a second locking member threaded into the internal threads of the threaded portion of the axle to secure the first locking member on the fastening portion of the axle; and
a chain guide movably coupled to the base member.

7. The bicycle derailleur according to claim 6, wherein the external threads are left hand threads and the internal threads are right hand threads.

8. The bicycle derailleur according to claim 6, wherein the external threads are oppositely threaded relative to the internal threads.

9. The bicycle derailleur according to claim 6, wherein the head portion includes a radial abutment.

10. The bicycle derailleur according to claim 6, wherein the first locking member includes a continuous annular abutment arranged to limit axial movement of the base member in a second axial direction of the shaft portion.

11. The bicycle derailleur according to claim 6, further comprising
a motor element configured and arranged to move the chain guide.

* * * * *